United States Patent [19]

Kalfoglou

[11] 4,016,932
[45] Apr. 12, 1977

[54] SURFACTANT OIL RECOVERY METHOD FOR USE IN HIGH TEMPERATURE FORMATIONS CONTAINING WATER HAVING HIGH SALINITY AND HARDNESS

[75] Inventor: George Kalfoglou, Houston, Tex.
[73] Assignee: Texaco Inc., New York, N.Y.
[22] Filed: Dec. 24, 1975
[21] Appl. No.: 643,965
[52] U.S. Cl. .............................. 166/303; 166/272; 166/275
[51] Int. Cl.² ................... E21B 43/22; E21B 43/24
[58] Field of Search .................... 166/273–275, 166/252, 303, 272; 252/8.55 D

[56] References Cited

UNITED STATES PATENTS

| | | |
|---|---|---|
| 3,508,612 | 4/1970 | Reisberg et al. .................... 166/274 |
| 3,515,214 | 6/1970 | Finch ............................. 166/274 X |
| 3,638,728 | 2/1972 | Hill ................................. 166/273 |
| 3,792,731 | 2/1974 | Feuerbacher et al. ............ 166/274 |
| 3,800,873 | 4/1974 | Kelly et al. ...................... 166/272 |
| 3,811,504 | 5/1974 | Flournoy et al. .............. 166/274 X |
| 3,811,505 | 5/1974 | Flournoy et al. .................. 166/274 |
| 3,811,507 | 5/1974 | Flournoy et al. .............. 166/273 X |
| 3,827,497 | 8/1974 | Dycus et al. ...................... 166/274 |
| 3,854,531 | 12/1974 | Carlin ............................... 166/272 |
| 3,858,656 | 1/1975 | Flournoy et al. .................. 166/274 |

Primary Examiner—Stephen J. Novosad
Attorney, Agent, or Firm—Jack H. Park; Carl G. Ries; Thomas H. Whaley

[57] ABSTRACT

Surfactant systems employing two or more surfactants, one anionic and one or more non-ionic surfactants such as polyethoxylated alkylaryl compounds or polyethoxylated alkyl or alkylaryl thiol, are useful in recovering oil from formations which also contain water having high salinities, e.g., salinities greater than about 40,000 parts per million, and which may also contain high concentrations of divalent ions such as calcium and/or magnesium, e.g., greater than about 3,000 parts per million calcium and magnesium. Polyethoxylated alcohols, alkyl phenols or polyethoxylated alkyl or alkylaryl thiols have well defined cloud points, and as a consequence thereof, if the formation temperature is much above the cloud point of the polyethoxylated compound, the surfactant fluid exhibits phase instability which degrades the oil recovery efficiency. Superior results are obtained if the ethoxylated surfactant is chosen to have a cloud point slightly above the formation temperature, and the concentration of divalent ions in the surfactant systems containing two or more surfactants, is maintained at high enough levels to prevent phase instability problems.

19 Claims, 6 Drawing Figures

SURFACTANT OIL RECOVERY METHOD FOR USE IN HIGH TEMPERATURE FORMATIONS CONTAINING WATER HAVING HIGH SALINITY AND HARDNESS

BACKGROUND OF THE INVENTION

This invention relates to an oil recovery process employing a fluid containing two or more surfactants, at least one of which is a polyethoxylated alcohol, alkyl phenol, or other alkylaryl compound. More particularly, this invention concerns an oil recovery process suitable for use in oil formations containing water having high salinity and hardness and which additionally may be hotter than about 100° F., so as to avoid phase instability of the surfactant fluid in the higher temperature environment.

Field of the Invention

Petroleum is found in subterranean formations or reservoirs in which it has accumulated, and recovery is initially accomplished by pumping or permitting the petroleum to flow to the surface of the earth through wells drilled into and in fluid communication with the subterranean formations. Petroleum can be recovered from subterranean formations only if certain conditions exist. There must be an adequately high concentration of petroleum in the formation, and there must be adequate permeability or interconnected flow channels throughout the formation to permit the flow of fluids therethrough if sufficient pressure is applied to the fluid. When the subterranean petroleum-containing formation has natural energy present in the form of an underlying active water drive, solution gas, or a high pressure gas cap above the petroleum within the formation, this natural energy is utilized to recover petroleum. In the primary phase of petroleum recovery, petroleum flows to wells drilled in the formation, which petroleum is displaced toward the wells by this natural energy. When the natural energy source is depleted or in the instance of those formations which do not originally contain sufficient natural energy to permit primary recovery operations, some form of supplemental recovery process must be applied to the reservoir. Supplemental recovery is frequently referred to as secondary recovery, although in fact it may be primary, secondary or tertiary in sequence of employment.

Petroleum recovery operations involving the injection of water into the formation for the purpose of displacing petroleum toward the production wells, commonly referred to as waterflooding, is the most economical and widely practiced form of supplemental recovery. Water does not displace petroleum with high efficiency, however, since water and oil are immiscible and the interfacial tension between water and oil is quite high. Persons skilled in the art of oil recovery have recognized this weakness of water flooding and many additives have been described in the prior art for decreasing the interfacial tension between the injection water and the formation petroleum. Petroleum sulfonates have been disclosed in many references for use in oil recovery operations, but petroleum sulfonates have limitations with respect to formation water salinity, hardness, and other factors which frequently restrict their usefulness. U.S. Pat. No. 3,811,504 describes a three-component surfactant system comprising an anionic surfactant such as an alkyl or alkylaryl sulfonate plus a non-ionic surfactant such as a polyethoxylated alkyl phenol plus a polyethoxylated alkyl surface. U.S. Pat. No. 3,811,505 describes a dual surfactant system employing an anionic surfactant such as alkyl or alkylaryl sulfonate, or phosphate, plus a nonionic surfactant such as polyethoxylated alkyl phenol or polyethoxylated aliphatic alcohol. U.S. Pat. No. 3,811,507 describes an oil recovery method using a dual surfactant system comprising an anionic surfactant such as a linear alkyl or a linear alkylaryl sulfonate, plus a sulfated polyethoxylated aliphatic alcohol. These systems permit the use of surfactant flooding processes in formations containing from 500 to 12,000 parts per million polyvalent ions such as calcium and magnesium.

While the foregoing multicomponent surfactant systems are effective for many applications, there are problems in the use of certain systems containing polyethoxylated hydrocarbon nonionic surfactants in subsurface petroleum formations whose temperatures exceed a value greater than about 100° F. It is known that the polyethoxylated nonionic surfactants have specific cloud points, or temperatures above which they are relatively insoluble, and it is believed that the problems experienced in the use of such nonionic surfactants in high temperature formations, which are manifest in phase separation phenomena, are associated with the cloud point of the nonionic surfactants. It is known in the art that the cloud point of polyethoxylated alkyl phenols, for example, increases with the degree of ethoxylation, i.e., with the average number of ethoxy groups associated with the molecule. It is also known that the cloud point decreases as the salinity of the surfactant solution increases. For example, an ethoxylated nonyl phenol having ten ethoxy groups per molecule will have a cloud point of about 138° F. in essentially pure water, and the cloud point will be reduced to about 94° F. in a 10 percent sodium chloride brine solution. It is further known that the maximum detergency using an aqueous solution of a polyethoxylated alkyl phenol occurs at the cloud point of the particular ethoxylate. See, for example, "Nonionic Surfactants" by Ed Martin, J. Schick, published by Marcel Decker Inc., New York 1967. It is not taught in the literature, however, how the cloud point of an ethoxylated nonionic surfactant when used in combination with one or more other surfactants in an oil recovery process being applied to a formation containing high quantities of divalent ions such as calcium and/or magnesium as well as high salinities, affects the surfactant action.

In view of the foregoing discussion, it can be readily appreciated that there is a substantial commercial need at the present time for an oil recovery method which can be applied to formations containing high salinity and hard water, which formations have a temperature greater than 100° F., e.g. from about 100° to about 150° F. (37.8° to 65.6° C.).

SUMMARY OF THE INVENTION

I have discovered that surfactant systems containing two or more surfactants, at least one of which is an ethoxylated hydrocarbon such as an ethoxylated alkyl phenol, an ethoxylated aliphatic alcohol, or an ethoxylated alkyl or alkylaryl thiol, may be employed in subterranean, petroleum-containing formations for the purpose of recovering petroleum therefrom, which formations initially contain water having high salinity and high concentrations of polyvalent ions such as calcium or magnesium, the temperature of the formations also being from about 100° to about 150° F. The cloud points of a number of ethoxylated surfactants are determined in aqueous solutions containing about the same salinity and about the same concentration of divalent ions such as calcium and/or magnesium as is present in the water contained in the formation to which the process is to be applied. An ethoxylated non-ionic surfactant having a cloud point slightly above the formation temperature is selected, and an aqueous solution containing this non-ionic surfactant together with the desired anionic surfactant such as petroleum sulfonates, or other sulfonated alkyl or alkylaryl compounds, which additionally contains about the same salinity and concentration of polyvalent ions as the formation water is injected into the formation. I have discovered that, surprisingly, the surfactant systems containing two or more surfactants undergo phase instability with a decrease in the concentration of polyvalent ions when tested in the temperature ranges specified above and under the salinity conditions given.

DESCRIPTION OF THE PREFERRED EMBODIMENTS

This invention concerns a surfactant oil recovery method applicable to subterranean petroleum-containing formations having relatively high salinity water, e.g., water containing from about 40,000 to about 120,000 parts per million total dissolved solids, which may also have dissolved therein from 3,000 to 12,000 parts per million polyvalent ions such as calcium or magnesium, the formation temperature being from about 100° to 150° F.

I have found that the degree of ethoxylation, e.g., the average number of ethoxy groups attached to the non-ionic surfactant which is used as a solubilizer or co-surfactant with an anionic primary surfactant such as petroleum sulfonate, alkyl sulfonate, or an alkylaryl sulfonate, is very critical. In high salinity, hard water formations, it is necessary to adjust the degree of ethoxylation precisely based on tests performed at the formation temperature using an aqueous solution whose salinity and polyvalent ion concentration very nearly matches the salinity and polyvalent ion concentration of the formation water in which the surfactant flood is to be performed.

The surfactant system itself will ordinarily comprise at least two components which are described below.

1. An anionic surfactant which may be an organic sulfonate such as a petroleum sulfonate or a synthetic sulfonate having the following general formula:

$$[R-SO_3]^- Y^+$$

where R is an alkyl or an alkylaryl radical, linear or branched, having from 5 to 25 carbon atoms and preferably from 8 to 16 carbon atoms on the alkyl chain, and Y is a monovalent cation such as sodium, potassium, or ammonium.

2. A nonionic surfactant having one of the following two structures:

a. $R'-O-(CH_2CH_2-O)_n-H$ (Ethoxylated alcohol or alkyl phenol) wherein $R'$ is an alkyl or an alkylaryl radical having from 5 to 20 carbon atoms and preferably from 8 to 16 carbon atoms in the alkyl chain, and $n$ is a number from 4 to 20 and preferably from 8 to 16, or b. $R'-S-(CH_2CH_2O)_n-H$ (Ethoxylated alkyl or alkyl aryl thiol) wherein $R'$ and $n$ have the same meaning as above, and S is sulfur.

A third general type of surfactant is sometimes utilized, which may be in addition to the above identified general classes of surfactants, or it may be used in place of the ethoxylated alkyl or alkylaryl compound listed under Item (2) above. This additional type is a sulfated or sulfonated, ethoxylated alkyl or alkylaryl compound. The remainder of the disclosure will be restricted to the simpler, two-component system comprising an anionic surfactant such as petroleum sulfonate or an alkylaryl sulfonate, plus a nonionic surfactant such as an ethoxylated aliphatic alcohol or an ethoxylated alkyl phenol, or corresponding thiols.

It is well known that when a two-component system is utilized in order to tailor the surfactant performance to the salinity and hardness of the formation water, the concentration of each of the materials is quite critical and extensive laboratory tests should be performed in order to design an optimum surfactant composition for any particular application. Generally, the concentration of each of the surfactant components will be from about 0.05 percent to about 5 percent and preferably from about 0.2 percent to about 2 percent by weight of each of the materials. Ordinarily, the ratio of the primary anionic surfactant to the nonionic surfactant is inversely related to the salinity and total hardness of the aqueous solution in which it is to be utilized. Although the best results will always be obtained when the exact ratio is identified by actual experimentation, the following general rule of thumb will suffice as a preliminary estimate in order to arrive at ratios for initial experimentation. If the formation water total hardness is from about 3,000 to about 6,000 parts per million, the weight ratio of anionic to nonionic surfactant should be between about 3:1 to about 1:1. For formation water having a total hardness in the range of from about 5,000 to about 12,000 parts per million, the ratio of anionic to nonionic surfactant can be between about 2:1 to about 1:3.

The molecular characteristics of the surfactants used is similarly an important factor. For example, the equivalent weight of the petroleum sulfonate or other hydrocarbon sulfonate and the number of carbon atoms and ethoxy groups in the nonionic surfactant all affect the performance of a multi-component surfactant in any particular crude oil and formation water salinity, hardness and temperature values.

In the practice of my invention, ordinarily the formation into which the surfactant solution will be injected will have been subjected to water flooding. Although this is not a necessary first step for the proper functioning for the process of my invention, ordinarily water flooding will be practiced in a field if any substantial amount of additional oil can be recovered from the formation by application of water flooding.

After water flooding has continued until the water-oil ratio at the producing wells rises to such a high value that further production of petroleum from the well is impossible or economically unattractive, surfactant flooding may begin. Ideally, injection of surfactant should be initiated before the water-oil ratio rises to a value such that further commercial production is unattractive, so as to avoid a long period of time before further additional oil production is accomplished since there is necessarily a long lag time between the initiation of surfactant fluid injection and the observation of improved stimulation from the production well.

If it is known or determined by experimentation that adsorption of surfactant will be a substantial problem, it is generally preferable to inject into the formation prior to the injection thereinto of the aqueous surfactant solution, an aqueous solution of a material which is strongly adsorbed by the formation to serve as a sacrificial adsorption agent. When the substance is adsorbed from solution, the adsorption capacity of the formation rock is satisfied and subsequent fluids injected into the formation will be less strongly adsorbed by the formation rock. Suitable materials for use as a sacrificial adsorption agent include water soluble salt containing carbonates, halogens, especially fluorides, phosphate, and polyphosphate wetting agents. In formations containing hich concentrations of divalent ions such as calcium and/or magnesium, care should be exercised in choosing the sacrificial agent so as to avoid the precipitation of the material upon contacting the divalent ions in the formation, which can at least reduce the effectiveness of the material for preventing surfactant adsorption, and which may lead to plugging of minor flow channels in the formation which can ultimately seriously reduce oil recovery efficiency.

In the practice of my invention, an aqueous solution which represents from about two to about 100 pore volume percent of a surfactant solution described herein is injected into the formation. Generally, the surfactant solution will also have a salinity about equal to the salinity of formation water, since the surfactant will have been tailored so as to provide maximum oil recovery efficiency at the salinity existing in the formation. Additionally, the concentration of polyvalent ions, such as calcium and/or magnesium, should similarly match the concentration thereof in the formation water. Furthermore, as will be detailed below, there is sometimes observed a minimum concentration of polyvalent ions in order to avoid phase separation of the surfactant fluids in high temperature formations. This can only be identified by experimentation.

It is generally good practice to inject into the formation after completion of injecting the surfactant solution an aqueous solution of a viscosity increasing additive. Hydrophilic polymers such as polyacrylamides and polysaccharides are especially effective for this purpose. Ordinarily from about 100 to about 1,000 parts per million of this hydrophilic polymer is sufficient to increase the viscosity of the fluid injected after the surfactant solution to achieve the desired efficient displacement of the surfactant fluid and the formation petroleum displaced thereby. This viscous fluid injection is commonly referred to as a mobility buffer, since the purpose of injecting the viscous solution is the improvement of the mobility ratio between the displaced fluid and the displacing fluid.

Once the surfactants to be used in the process of my invention have been generally identified, the formation temperature should be determined in order to determine the optimum degree of ethoxylation of the nonionic surfactant to be employed as a co-surfactant with the chosen primary anionic surfactant. The cloud point of the ethoxylated compound should be selected so that its cloud point in a fluid, essentially identical to the formation water in salinity and concentration of polyvalent ions, is slightly greater than the average formation temperature. Specifically, the cloud point should be from 1° to 20° F. and preferably from 5° to 15° F. above the formation temperature.

Ordinarily the cloud point of ethoxylated alkyl phenols, thiols and other ethoxylated hydrocarbons, increases with the degree of ethoxylation. As an example, the cloud point of a series of ethoxylated nonylphenols is deionized water ranges from about 125° F. for a compound having an average of 9.5 ethoxy groups per molecule to about 180° for a nonyl phenol having 12 ethoxy groups per molecule and to about 200° F., for a nonyl phenol having 15 ethoxy groups per molecule. The cloud point is decreased as the salinity of the fluid in which the ethoxylated alkyl phenol is dissolved is increased. For example, while the cloud point of a nonyl phenol having 12 ethoxy groups per molecule is around 180° F. in deionized water, it drops to a value of about 124° F. in a 10 percent sodium chloride solution. Thus it can be appreciated that the cloud point must be determined in an aqueous solution having a salinity about equal to the salinity of the formation water, or the compound will not have the desired cloud point value as identified above.

The cloud points for ethoxylated aliphatic alcohol, alkyl phenols and corresponding ethoxylated thiols all increase with the degree of ethoxylation; however, the ethoxylated thiols exhibit somewhat higher cloud points than ethoxylated alcohols and phenols having similar numbers of carbon atoms and ethoxy groups. It should also be remembered that while raising the average number of ethoxy groups per molecule increases the cloud point of ethoxylated alcohols and thiols, the surfactant's solubility in water is also increased as a consequence of increasing the degree of ethoxylation. Dual surfactant systems designed to operate in specific formation water exhibit optimum performance when the surfactants are on the threshhold of solubility, or slightly soluble in both water and oil. If the water solubility of one of the surfactants is increased significantly, (as by increasing the degree of ethoxylation to increase the cloud point of the surfactant) the effectiveness of the surfactant system is diminished. Slight increases in degree of ethoxylation can be tolerated; however, if the formation temperature is significantly greater than the cloud point of the surfactant system being considered, e.g., 10° F. or more, care must be exercised in increasing the degree of ethoxylation to adjust the cloud point according to my invention. A preferred method for effecting major changes in the cloud point of an ethoxylated alcohol or phenol is to change to an ethoxylated alkyl or alkylaryl thiol, which exhibits greater cloud point values for compounds having equivalent degrees of ethoxylations. The cloud point differential is so great that a thiol having smaller degree of ethoxylation may sometime be substituted for a given ethoxylated alcohol and yet realize an increase in the cloud point.

I have also found that the concentration of polyvalent ions such as calcium and/or magnesium in the solution is an unexpectedly critical parameter in the phase instability of surfactants under oil recovery conditions. It is necessary to maintain the concentration of polyvalent ions at a value which is at least equal to the concentration thereof in the formation water for which the system is designed. It is sometimes necessary to increase the concentration of polyvalent ions in order to ensure phase stability.

EXPERIMENTAL SECTION

In order to evaluate the effectiveness of the present method and to determine the degree of improvement in oil recovery efficiency resulting therefrom, the following experimental laboratory work was performed.

Figure 1:
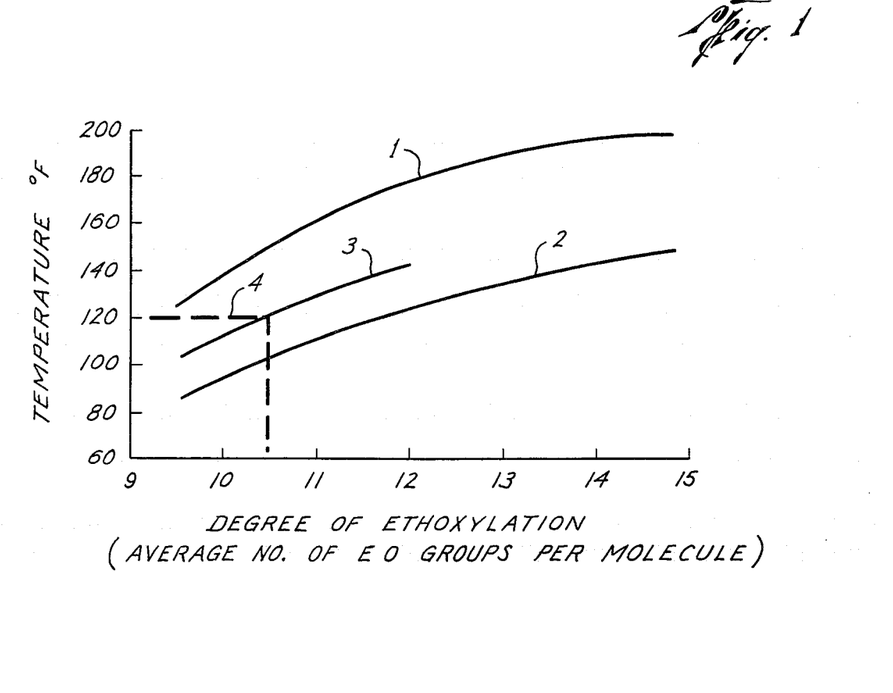
FIG. 1 illustrates the cloud points of a series of 1% solutions of ethoxylated alkyl phenols differing only in the degree of ethoxylation. Each curve depicts the cloud points of aqueous solutions of ethoxylated nonyl phenols at varying salinities.

A series of tests were performed to measure the temperature stability or cloud points of various polyethoxylated nonyl phenols under different salinity conditions, and the results are given in FIG. 1. Three samples of ethoxylated nonyl phenol were used, one having an average number of ethoxy groups per molecule of about 9.3, the second one having an average of about 12 ethoxy groups per molecule, and the third sample having an average of about 15 ethoxy groups per molecule. Mixtures of the first two samples were prepared in field water in order to achieve intermediate values between 9.3 and 12.

Curve 1 of FIG. 1 demonstrates the change in cloud point values measured in distilled water of nonyl phenol with increasing numbers of ethoxy groups. It can be seen that the cloud point varies from about 125° F. for the 9.3 ethoxy group per molecule sample to about 200° F. for the 15 ethoxy groups per molecule sample. Curve 2 shows the same series of measurements performed in a 10 percent sodium chloride brine. It can be seen that the cloud point is uniformly about 40° F. lower in a 10 percent brine solution than in deionized water. Curve 3 demonstrates the cloud point measured in a field water the salinity of which was about 65,000 parts per million total dissolved solids. It can be seen that the cloud point values were intermediate between the deionized water and 10 percent brine values.

A second series of experiments were performed in which the capillary displacement was measured in an aqueous solution containing ethoxylated nonyl phenols mixed with an alkylaryl sulfonate. Capillary displacement tests provide a convenient method for determining the optimum concentration of surfactants and the optimum salinity and hardness ranges for the systems being evaluated. The tests are performed by filling a number of closed end capillary tubes with the particular crude oil being studied and submerging the capillary tubes horizontally in the desired aqueous phase. The aqueous phase of each of the tests will be comprised of the indicated mixture of field water plus the surfactant mixture being evaluated. In each instance in which any displacement of oil by the aqueous phase occurred, an oil-water meniscus is formed. The only force tending to displace oil from the capillary tube is the force resulting from the difference in specific gravities of the two fluids. The force is offset by the interfacial tension between oil and the formation water, and it was observed that essentially no displacement occurred in the instance of field water having no surfactant added thereto, or in tests in which surfactants were ineffective for oil displacement purposes. When the surfactant composition succeeded in producing a movement of the meniscus, the distance traveled by the meniscus in millimeters in a 5 minute exposure period in the chemical system is recorded, and this is the displacement in millimeters that is plotted in FIGS. 2 and 3. The maximum value of capillary displacements generally corresponds to the maximum reduction in interfacial tension between the oil and the field water, which corresponds to optimum petroleum recovery conditions.

Figure 2:
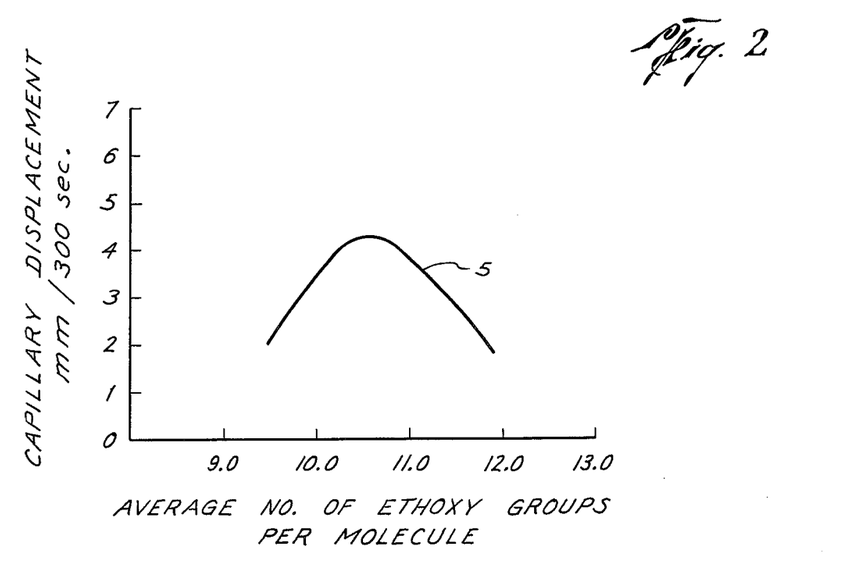
FIG. 2 illustrates the capillary displacement of an oil-water meniscus in a glass capillary tube, which is generally indicative of surfactant effectiveness, performed in a field system having a salinity of 65,000 parts per million total dissolved solids, using a dual surfactant system comprising an alkyl benzene sulfonate and a series of ethoxylated nonyl phenols differing only in the degree of ethoxylation, from about 9½ to about 12.

The capillary displacement measurements 5 plotted in FIG. 2 were made employing a dual surfactant system comprising 0.4 percent Sulframin 1240, a linear alkyl benzene sulfonate, and 0.6 percent of a polyethoxylated alkyl phenol with the average number of ethoxy groups being varied from about 9.3 to about 12.0. These tests were performed at 109° F., which is the temperature of the formation from which the field water and crude oil were obtained. It can be seen that the maximum capillary displacement occurs when a polyethoxylated nonyl phenol having an average of 10.6 ethoxy groups per molecule is used in combination with the alkyl benzene sulfonate in this particular system.

The cloud point of the polyethoxylated nonyl phenol yielding the maximum capillary displacement in FIG. 2 should be compared with the temperature of the formation. This is shown with the dotted line 4 which indicates that for a degree of ethoxylation of 10.6 the cloud point reading would be about 119° F. Thus the maximum oil recovery in this particular instance was achieved using a polyethoxylated nonyl phenol having a cloud point about 10° above the average formation temperature. This is a consistently reproducible observation, and generally the optimum results are obtained when the cloud point of the surfactant is from about 1° to about 20° F. and preferably from about 5° to about 15° F. above the formation temperature. Dual surfactant systems using polyethoxylated alkyl phenols, thiols, etc., having somewhat higher ethoxylation numbers or somewhat lower ethoxylation numbers than the optimum value will result in a lower capillary displacement and in a correspondingly lower oil recovery effectiveness.

During the course of performing these experiments with the dual surfactant system identified above, it was observed that phase separation occurred when the aqueous fluid hardness or concentration of divalent ions, including calcium and magnesium, was lower than about 7,000 parts per million. Thus it was necessary to maintain the hardness of the aqueous solution above about 7,000 parts per million calcium and magnesium in order to avoid phase separation at 109° F. Indeed this, too, is an unexpected result, since ordinarily it would be expected that the cloud point of the polyethoxylated nonyl phenol would be lowered by increasing concentration of dissolved salts. A possible explanation for the phase separation phenomenon may be that the dual surfactant system in the aqueous solution is stabilized by the divalent ions present and a certain minimum concentration is required to prevent phase separation.

Another series of capillary displacement tests were performed utilizing the optimum mixture of ethoxylated nonyl phenol and alkyl benzene sulfonate as identified above, with the temperature at which the capillary displacements were made being varied over a value from about 80° to about 140° F. These results are shown in Curve 6 of FIG. 3, and it can be seen that the optimum capillary displacement occurs at about 90° F., with lower values being observed in tests conducted at values less than or greater than 90° F.

Figure 3:
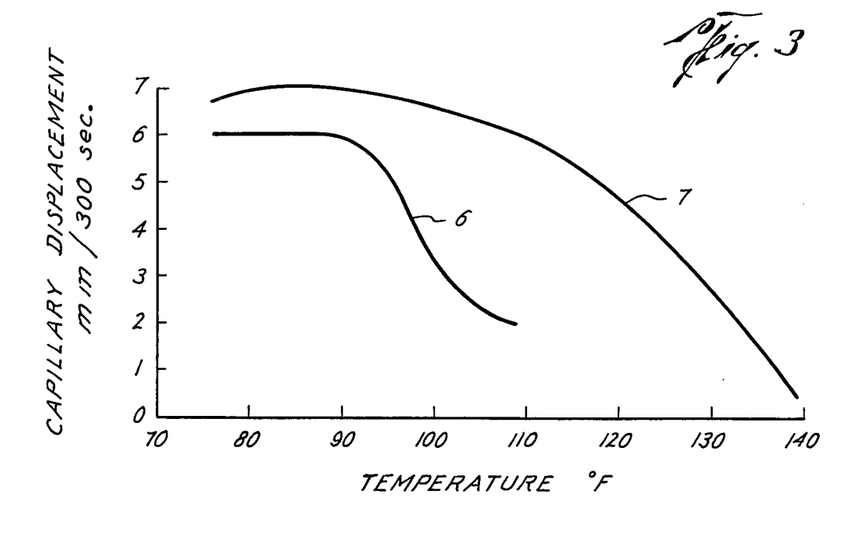
FIG. 3 illustrates the capillary displacement for (1) series of runs performed using a mixture of an alkyl benzene sulfonate anionic surfactant and an ethoxylated nonyl phenol having an average 10.6 ethoxy groups per molecule, with the temperature varying from about 80° to about 140° F., and (2) for a similar series of runs using a dual system comprising an alkyl benzene sulfonate and an ethoxylated alkyl thiol.

A similar series of tests were run using an alkylbenzene sulfonate plus a 9.5 EO ethoxylated t-dodecyl thiol, and the results are depicted in curve 7 of FIG. 3. It can be seen from this curve that satisfactory displacement was obtained at temperatures about 30° F. higher using the thiol system than the ethoxylated alkylphenol system.

Figure 4:
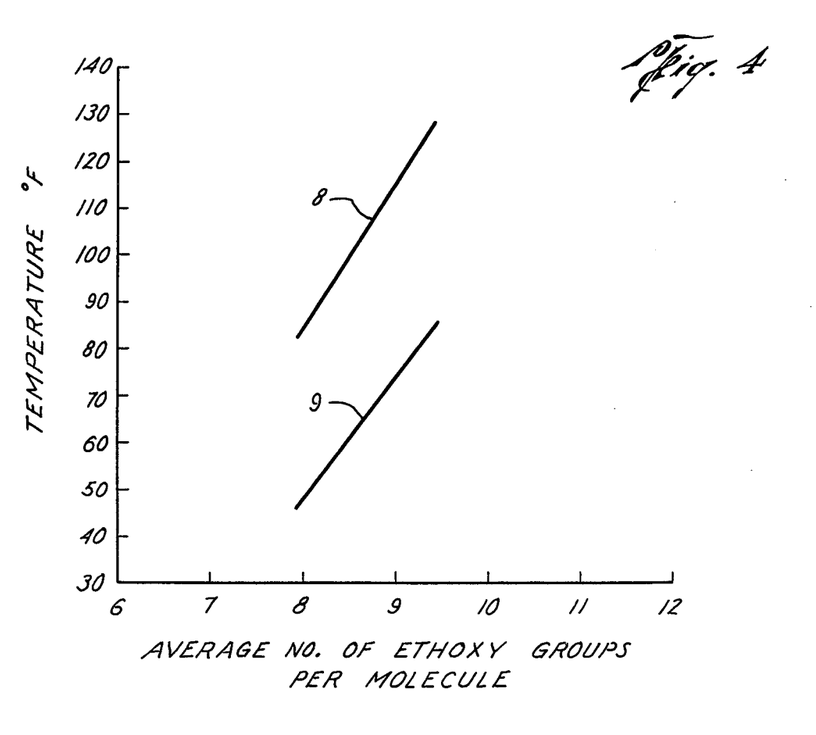
FIG. 4 depicts the variation in cloud points both in distilled water and in a 10% solution NaCl of polyethoxylated t-dodecyl thiol with the average number of ethoxy groups per molecule being varied from 8 to 9.5.

The cloud points for ethoxylated alkyl thiols were performed using a t-dodecyl thiol in deionized water and in a 10% sodium chloride system. The results, shown in FIG. 4, reveal that the cloud points in distilled water, curve 8, varies from about 80° to 130° F. as the degree of ethoxylation is increased from 8 to 9.5, whereas in a 10% sodium chloride solution, the cloud points vary from about 46° to 87° F. over the same range of degree of ethoxylation.

In instances in which the ambient surface temperature is substantially less than the formation temperature for which the surfactant system is tailored, it may be necessary to heat the injected fluid to a temperature about equal to the formation temperature prior to injecting it into the formation in order to ensure that the optimum temperature exists at the point where oil displacement is occurring. This is generally necessary only in the initial stages since once the surfactant slug has been displaced away from the injection wellbore, it will pass through a substantial amount of formation prior to contacting the formation petroleum, and so will have achieved a temperature equilibrium therewith.

An oil displacement experiment was performed to verify the operability of the dual surfactant system in which the polyethoxylated alkyl phenol nonionic surfactant solubilizer is tailored to have a cloud point slightly above the temperature of the formation, said oil recovery test being performed at the same temperature as the formation temperature. A crushed limestone pack measuring 28.4 centimeters in length and 2.66 centimeters in diameter was utilized. The porosity of the pack was 53 percent and the permeability was 26,000 millidarcies.

A field water having a salinity of 70,000 parts per million total dissolved solids and about 7,500 parts per million clacium and magnesium was utilized in the test. The pack was first saturated with field water, then saturated with field crude in order to achieve an initial oil saturation of about 74 percent based on the pore volume of the pack. 1.5 pore volumes of field water were then injected into the core which reduced the oil saturation to about 22 percent, recovering approximately 69 percent of the oil originally present in the pack. This simulated a waterflood operation which would ordinarily be performed prior to the application of surfactant flooding in an acutal field test. Next, approximately one-half pore volume of an aqueous solution comprising 0.4 percent Sulframin 1240, an alkyl benzene sulfonate and 0.6 percent Surfonic N-106, a polyethoxylated nonylphenol containing an average of 10.6 ethoxy groups per molecule was utilized. The solution was formulated in the same field water described above. Eight-tenths percent marasperse C-21 a lignosulfonate, was also incorporated in the surfactant solution as an additive.

Figure 5:
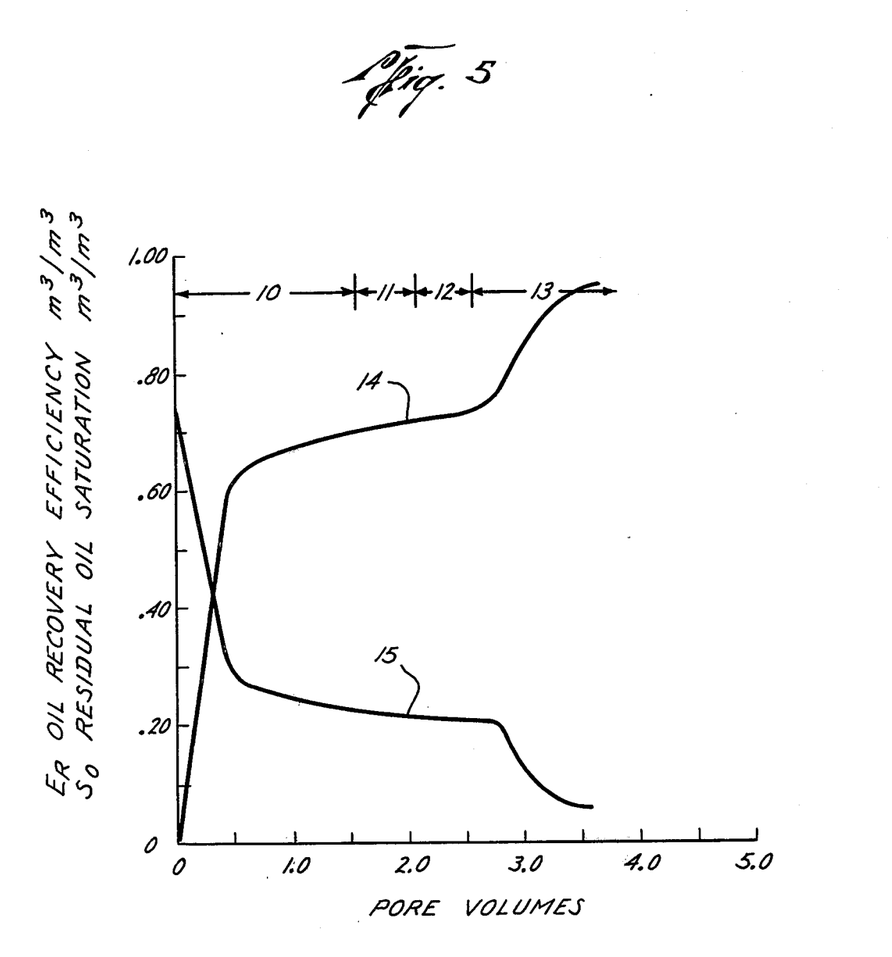
FIG. 5 illustrates the oil recovery efficiency and oil saturation observed in a displacement test performed in a crushed limestone pack using a mixture of an alkyl benzene sulfonate and an ethoxylated nonyl phenol having an average of 10.6 ethoxy groups per molecule.

After injection of the surfactant solution, a one-half pore volume slug of an aqueous solution containing 1,000 parts per million Kelzan, a polysaccharide viscosity-increasing agent conventionally used in surfactant flooding as a mobility buffer, was injected to displace the surfactant slug through the pack. Field water was then again injected and this was continued until the water-oil ratio exiting from the pack again rose to a high value signifying completion of the experiment. The results are shown in FIG. 5, showing oil recovery efficiency 14 and residual oil saturation 15 as a function of pore volumes of injected fluid. The waterflood interval indicated by Zone 10 recovered about 69 percent of the oil in the pack. After injection of surfactant (zone 11) and the mobility buffer slug (zone 12) and continuation of water injection (zone 13), the total oil recovery was raised to about 94 percent with the residual oil saturation being about 5 percent. This is considered to be a very satisfactory surfactant displacement, and indicates the operability of the system designed in accordance with the process of my invention.

For comparison purposes, a second experiment was performed in essentially the same pack using essentially the same procedure and reagents, except that the nonionic surfactant used as a solubilizer for the Sulframin 1240 contained an average of 9.3 ethylene oxide groups per molecule rather than the 10.6 as was utilized in the experiment described above and depicted in FIG. 5. The final oil recovery was only 78 percent, demonstrating the reduced oil recovery efficiency of the system when the solubilizer is a polyethoxylated alkyl phenol having a cloud point substantially less than the temperature of the formation.

Figure 6:
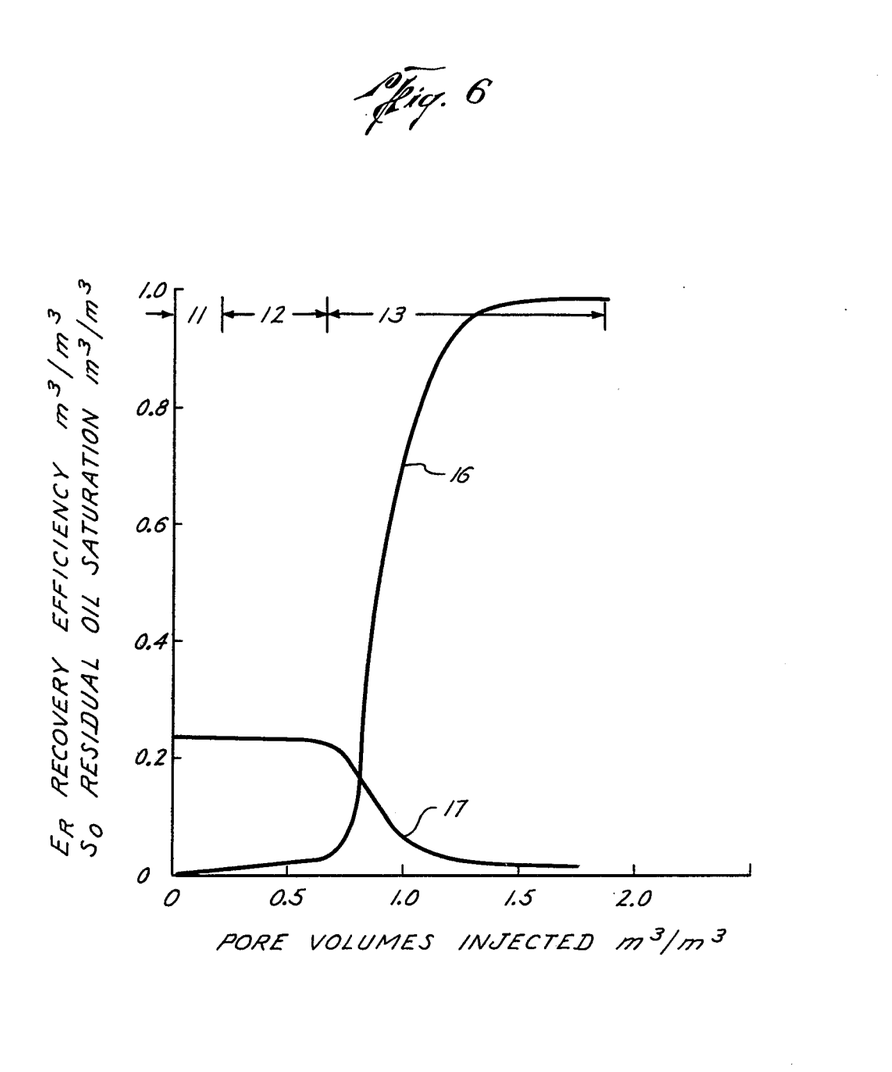
FIG. 6 illustrates the oil recovery and reduction in oil saturation realized in a displacement test conducted in a limestone pack at 77° F. (25° C.) using a dual surfactant system comprising an alkyl benzene sulfonate and a polyethoxylated t-dodecyl thiol having an average of 9.5 moles of ethylene oxide per molecule, at a salinity of 60,000 parts per million total dissolved solids.

A third oil displacement test was performed under conditions similar to the first run, but using ethoxylated alkyl thiol rather than the ethoxylated alkylphenols of the first two tests. The test was conducted in a crushed limestone pack at 77° F. (25° C.). The pack porosity was 44% and the permeability was 28,100 millidarcies. The water used for the water-flood portion as well as the water used in formulating the surfactant solution had a salinity of 60,000 parts per million total dissolved solids. The surfactant solution contained 0.4% of an alkylbenzene sulfonate and 0.6% of a 9.5 mole ethylene oxide adduct of tert-dodecyl thiol in the 60,000 parts per million salinity simulated field water. As can be seen from FIG. 6, Er, oil recovery efficiency 16 reached about 97% and So, residual oil saturation 17 was reduced to about 1%, which are considered to be excellent results.

Thus I have disclosed and demonstrated that the oil recovery efficiency is improved significantly in the use of a dual surfactant system employing at least one nonionic surfactant such as a polyethoxylated alkyl phenol, polyethoxylated aliphatic alcohol or polyethoxylated alkyl or alkylaryl thiol, if the degree of ethoxylation of the nonionic surfactant is adjusted so that the non-ionic surfactant's cloud point is from about 1° to about 20° F. and preferably from 5° to 15° F. greater than the temperature of the oil formation. While my invention has been described in terms of a number of illustrative embodiments, it is not so limited since many variations thereof will be apparent to persons skilled in the art of oil recovery by surfactant flooding without departing from the true spirit and scope of my invention. Similarly, while a mechanism has been proposed to explain the benefits resulting from the process of my invention, it is not intended hereby to be limited to any particular explanation of the mechanism involved in the process of my invention, but this mechanism is provided only for purposes of additional disclosure. It is may desire and intention that my invention be restricted and limited only by those restrictions and limitations contained in the claims appended hereinafter below.

I claim:

1. A method for recovering petroleum from a subterranean, permeable, petroleum-containing formation, which formation also contains water having a salinity from about 40,000 to about 120,000 parts per million total dissolved solids and a concentration of polyvalent ions including calcium and magnesium from about 3,000 to about 12,000 parts per million, said recovery method being of the type wherein an aqueous saline fluid containing at least two surfactants, one primary anionic surfactant selected from the group consisting of petroleum sulfonate, alkyl sulfonates, aliphatic sulfonates, and alkylaryl sulfonates, and at least one nonionic surfactant selected from the group consisting of polyethoxylated aliphatic compounds, polyethoxylated alkylaryl compounds, and polyethoxylated alkyl or alkylaryl thiols is injected into the formation to displace petroleum, wherein the improvement comprises:
   a. adjusting the average number of ethoxy groups per molecule of the nonionic surfactant to result in the nonionic surfactant's cloud point determined in an aqueous solution having salinity and polyvalent ion concentration about equal to the salinity and divalent ion concentration of the formation water, being from about 1° to about 20° F. greater than the temperature of the formation.

2. A method as recited in claim 1 wherein the number of ethoxy groups associated with the nonionic surfactant is chosen so the cloud point is from about 5° to about 15° F. greater than the temperature of the formation.

3. A method as recited in claim 1 wherein the nonionic surfactant is an ethoxylated alkyl phenol.

4. A method as recited in claim 1 wherein the nonionic surfactant is an ethoxylated aliphatic alcohol.

5. A method as recited in claim 1 wherein the nonionic surfactant is an ehtoxylated alkyl thiol.

6. A method as recited in claim 1 wherein the nonionic surfactant is an ethoxylated alkylaryl thiol.

7. A method as recited in claim 1 wherein the temperature of the formation is from about 80° to about 150° F.

8. A method as recited in claim 1 wherein the salinity of the surfactant fluid is about equal to the salinity of the formation water.

9. A method as recited in claim 1 wherein the surfactant solution also contains polyvalent ions including calcium and magnesium in a concentration at least as great as the concentration of polyvalent ions in the formation water.

10. A method as recited in claim 1 comprising the additional step of heating the surfactant fluid to a temperature about equal to the formation temperature prior to injecting it into the formation.

11. A method as recited in claim 1 wherein the average number of ethoxy groups per molecule of nonionic surfactant is chosen to yield a cloud point from 5° to 15° F. above the formation temperature.

12. A method for recovering petroleum from a subterranean petroleum-containing permeable formation, said formation also containing water having a salinity from about 40,000 to about 120,000 parts per million total dissolved solids and from 3,000 to 12,000 parts per million divalent ions including calcium and magnesium, the formation temperature being from 100° to 150° F., comprising:
   a. introducing into the formation a saline surfactant-containing aqueous fluid having about the same salinity as the formation water, and containing an organic sulfonate anionic surfactant and a polyethoxylated nonionic surfactant, the average number of ethoxy groups per nonionic surfactant molecule being sufficient to cause the cloud point of the polyethoxylated nonionic surfactant in an aqueous solution having about the same salinity and divalent ion concentration as the formation water to be from 1° to 20° F. greater than the temperature of the formation; and
   b. recovering oil displaced by the surfactant solution from the formation.

13. A method as recited in claim 12 wherein the average number of ethoxy groups per nonionic surfactant molecule is sufficient to give the nonionic surfactant a cloud point from 5° to 15° F. greater than the formation temperature.

14. A method as recited in claim 12 wherein the surfactant solution is heated to a temperature about equal to the formation temperature prior to injecting the solution into the formation.

15. A method as recited in claim 12 wherein the surfactant solution also contains a sulfated or sulfonated ethoxylated aliphatic or alkylaryl compound.

16. A method as recited in claim 12 wherein the non-ionic surfactant is a polyethoxylated alkyl phenol or a polyethoxylated aliphatic alcohol.

17. A method as recited in claim 12 wherein the non-ionic surfactant is a polyethoxylated aliphatic or alkylaryl thiol.

18. A method as recited in claim 12 wherein the anionic surfactant is petroleum sulfonate.

19. A method as recited in claim 12 wherein the anionic surfactant is an alkyl or alkylaryl sulfonate having from 5 to 25 carbon atoms.

* * * * *